US011229034B2

(12) United States Patent
Bhattacharya et al.

(10) Patent No.: US 11,229,034 B2
(45) Date of Patent: Jan. 18, 2022

(54) METHOD AND APPARATUS FOR CONCURRENT COEXISTENCE OF A PLURALITY OF RADIO ACCESS TECHNOLOGIES IN WIRELESS COMMUNICATION

(71) Applicant: NXP USA, Inc., Austin, TX (US)

(72) Inventors: Aveek Bhattacharya, Pune (IN); Ashish Vijay Bhattad, Pune (IN); Sriharsha Madhira, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 74 days.

(21) Appl. No.: 16/171,934

(22) Filed: Oct. 26, 2018

(65) Prior Publication Data

US 2019/0289611 A1   Sep. 19, 2019

Related U.S. Application Data

(60) Provisional application No. 62/643,102, filed on Mar. 14, 2018, provisional application No. 62/643,122, filed on Mar. 14, 2018, provisional application No. 62/643,424, filed on Mar. 15, 2018, provisional application No. 62/665,291, filed on May 1, 2018.

(51) Int. Cl.
*H04L 1/00* (2006.01)
*H04W 72/08* (2009.01)
*H04B 17/309* (2015.01)
*H04W 88/06* (2009.01)

(52) U.S. Cl.
CPC ........ *H04W 72/085* (2013.01); *H04B 17/309* (2015.01); *H04L 1/0007* (2013.01); *H04W 88/06* (2013.01)

(58) Field of Classification Search
CPC .............................. H04L 1/0007; H04W 88/06
See application file for complete search history.

(56) References Cited

U.S. PATENT DOCUMENTS

| 9,451,630 | B2* | 9/2016 | Chen | H04W 72/1215 |
| 2005/0197080 | A1* | 9/2005 | Ulupinar | H04W 52/0245 |
| | | | | 455/135 |
| 2011/0249576 | A1* | 10/2011 | Chrisikos | H01Q 9/14 |
| | | | | 370/252 |
| 2012/0265807 | A1* | 10/2012 | Kowalewski | H04L 65/1016 |
| | | | | 709/204 |

(Continued)

*Primary Examiner* — Hoon J Chung

(57) ABSTRACT

Aspects of the disclosure provide methods and an electronic device for wireless communication. A method includes transmitting, by a first transceiver, control packets via a first wireless communication channel using a first radio access technology. The method includes determining, by processing circuitry, a first parameter indicating an interval between transmissions of the control packets. Further, the method includes determining, based on the first parameter, a size limit for packets to be received by a second transceiver that is configured to receive the packets via a second wireless communication channel using a second radio access technology. The method includes transmitting, by the second transceiver, information indicating the size limit over the second channel so that sizes of the packets sent by the second radio access technology are such that the packets are received by the second transceiver in a time period within the interval between the transmissions of the control packets.

21 Claims, 8 Drawing Sheets

(56) References Cited

U.S. PATENT DOCUMENTS

| | | | |
|---|---|---|---|
| 2013/0301420 A1* | 11/2013 | Zhang | H04W 4/90 |
| | | | 370/241 |
| 2015/0085841 A1* | 3/2015 | Sadek | H04W 74/0808 |
| | | | 370/336 |
| 2015/0146552 A1* | 5/2015 | Majmundar | H04W 24/08 |
| | | | 370/252 |
| 2015/0350926 A1* | 12/2015 | Uchiyama | H04W 52/244 |
| | | | 455/418 |
| 2015/0382231 A1* | 12/2015 | Jabbar | H04W 24/08 |
| | | | 370/230 |
| 2018/0049037 A1* | 2/2018 | Lopez-Perez | H04W 72/1215 |
| 2018/0092047 A1* | 3/2018 | Merlin | H04W 52/04 |
| 2018/0132192 A1* | 5/2018 | Yang | H04B 7/0617 |
| 2018/0213463 A1* | 7/2018 | Cheng | H04W 40/14 |

\* cited by examiner

METHOD AND APPARATUS FOR CONCURRENT COEXISTENCE OF A PLURALITY OF RADIO ACCESS TECHNOLOGIES IN WIRELESS COMMUNICATION

INCORPORATION BY REFERENCE

This present disclosure claims the benefit of U.S. Provisional Application No. 62/643,102, "Method capable of improving performance for concurrent coexistence of multi-radio wireless communication systems by dynamically changing packet size" filed on Mar. 14, 2018, U.S. Provisional Application No. 62/643,122, "Method capable of improving performance for concurrent coexistence of multi-radio wireless communication systems by dynamically changing transmit power" filed on Mar. 14, 2018, U.S. Provisional Application No. 62/643,424, "Method capable of improving performance for concurrent coexistence of multi-radio wireless communication systems by dynamically changing receiver settings" filed on Mar. 15, 2018, and U.S. Provisional Application No. 62/665,291, "Method capable of improving performance for concurrent coexistence of wireless communication systems by reducing number of transmit antennae for transmitting short control and management frames" filed on May 1, 2018, which are incorporated herein by references in their entirety.

BACKGROUND

Electronic devices communicate with each other using various wireless communication networks. For example, the wireless communication networks include personal area networks, local area networks, and wide area networks. A plurality of radio access technologies are used in the wireless communication networks.

SUMMARY

Aspects of the disclosure provide a method for wireless communication. The method includes transmitting, by a first transceiver, control packets via a first wireless communication channel using a first radio access technology (RAT). The method includes determining, by processing circuitry, a first parameter indicating an interval between the control packets. The method includes determining, based on the first parameter, a size limit for packets to be received by a second transceiver that is configured to receive the packets via a second wireless communication channel using a second RAT. The method includes transmitting, by the second transceiver, information indicating the size limit over the second channel so that sizes of the packets to be sent using the second radio access technology are such that the packets are received by the second transceiver in a time period that is within the interval between the transmissions of the control packets.

In an embodiment, the size limit is determined based on the first parameter, sizes of the control packets, and a size margin based on the second RAT.

In an embodiment, the method further includes determining one or more channel indicators indicating at least one of a first channel quality of the first channel and a second channel quality of the second channel. Further, the method includes dynamically controlling, based on the at least one of the first channel quality and the second channel quality, operations of at least one of the first transceiver, a first antenna structure coupled to the first transceiver, the second transceiver, and a second antenna structure coupled to the second transceiver.

In an embodiment, the one or more channel indicators include a received signal strength indicator (RSSI) and a frame error rate (FER) of the first channel, the first transceiver includes a first transmitter, and the method further includes determining the RSSI and FER based on signals transmitted and received by the first transceiver. The method includes comparing the RSSI and FER with a pre-determined RSSI threshold and a pre-determined FER threshold, respectively. When the RSSI is determined to be larger than the RSSI threshold and the FER is determined to be less than the FER threshold, the method includes lowering a transmit power of the first transmitter.

In an embodiment, the one or more channel indicators include a RSSI of the first channel, the first antenna structure includes multiple antennas, and the method further includes measuring the RSSI based on signals received by the first transceiver. The method includes comparing the RSSI with a pre-determined RSSI threshold. When the RSSI is determined to be larger than the RSSI threshold, the method includes selecting a single antenna having a largest isolation from the second antenna structure to transmit the control packets where the single antenna is one of the multiple antennas.

In an embodiment, the second transceiver includes a second receiver, and the method further includes determining a signal to noise ratio (SNR) of the second channel, and adjusting receiver settings of the second receiver based on the SNR and a pre-determined isolation between the first antenna structure and the second antenna structure.

In an example, the first RAT is a WiFi RAT, and the second RAT is a Bluetooth RAT.

In an example, the control packets include acknowledgement packets (ACKs) and negative ACK packets (NACKs).

Aspects of the disclosure provide an electronic device for wireless communication. The electronic device includes a first transceiver, a second transceiver, and processing circuitry. The first transceiver is configured to communicate via a first channel using a first RAT, and the second transceiver is configured to communicate via a second channel using a second RAT. The processing circuitry is configured to determine a first parameter indicating an interval between transmissions of control packets by the first transceiver. The processing circuitry is configured to determine, based on the first parameter, a size limit for packets to be received by the second transceiver. The processing circuitry is configured to transmit information via the second transceiver indicating the size limit over the second channel so that sizes of the packets to be sent using the second radio access technology are such that the packets are received by the second transceiver in a time period that is within the interval between the transmissions of the control packets.

In an embodiment, the processing circuitry is configured to determine the size limit based on the first parameter, sizes of the control packets, and a size margin based on the second RAT.

In an embodiment, the processing circuitry is further configured to determine one or more channel indicators indicating at least one of a first channel quality of the first channel and a second channel quality of the second channel. Further, the processing circuitry is configured to dynamically control, based on the at least one of the first channel quality and the second channel quality, operations of at least one of the first transceiver, a first antenna structure coupled to the first transceiver, the second transceiver, and a second antenna structure coupled to the second transceiver.

In an embodiment, the one or more channel indicators include a RSSI and a FER of the first channel, the first transceiver includes a first transmitter, and the processing circuitry is configured to determine the RSSI and FER based on signals transmitted and received by the first transceiver. The processing circuitry is configured to compare the RSSI and FER with a pre-determined RSSI threshold and a pre-determined FER threshold, respectively. When the RSSI is determined to be larger than the RSSI threshold and the FER is determined to be less than the FER threshold, the processing circuitry is configured to reduce a transmit power of the first transmitter.

In an embodiment, the one or more channel indicators include a RSSI of the first channel, the first antenna structure includes multiple antennas, and the processing circuitry is configured to measure the RSSI based on signals received by the first transceiver, and compare the RSSI with a pre-determined RSSI threshold. When the RSSI is determined to be larger than the RSSI threshold, the processing circuitry is configured to select a single antenna having a largest isolation from the second antenna structure to transmit the control packets. The single antenna is one of the multiple antennas.

In an embodiment, the second transceiver includes a second receiver, and the processing circuitry is configured to determine a SNR of the second channel and adjust receiver settings of the second receiver based on the SNR and a pre-determined isolation between the first antenna structure and the second antenna structure.

Aspects of the disclosure provide a method for wireless communication. The method includes wirelessly communicating, by a first transceiver and a first antenna structure, via a first channel using a first RAT, and wirelessly communicating, by a second transceiver and a second antenna structure, via a second channel using a second RAT. The method includes determining, by processing circuitry, one or more channel indicators indicating at least one of a first channel quality of the first channel and a second channel quality of the second channel. The method includes dynamically controlling, based on the at least one of the first channel quality and the second channel quality, operations of at least one of the first transceiver, the first antenna structure, the second transceiver, and the second antenna structure.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
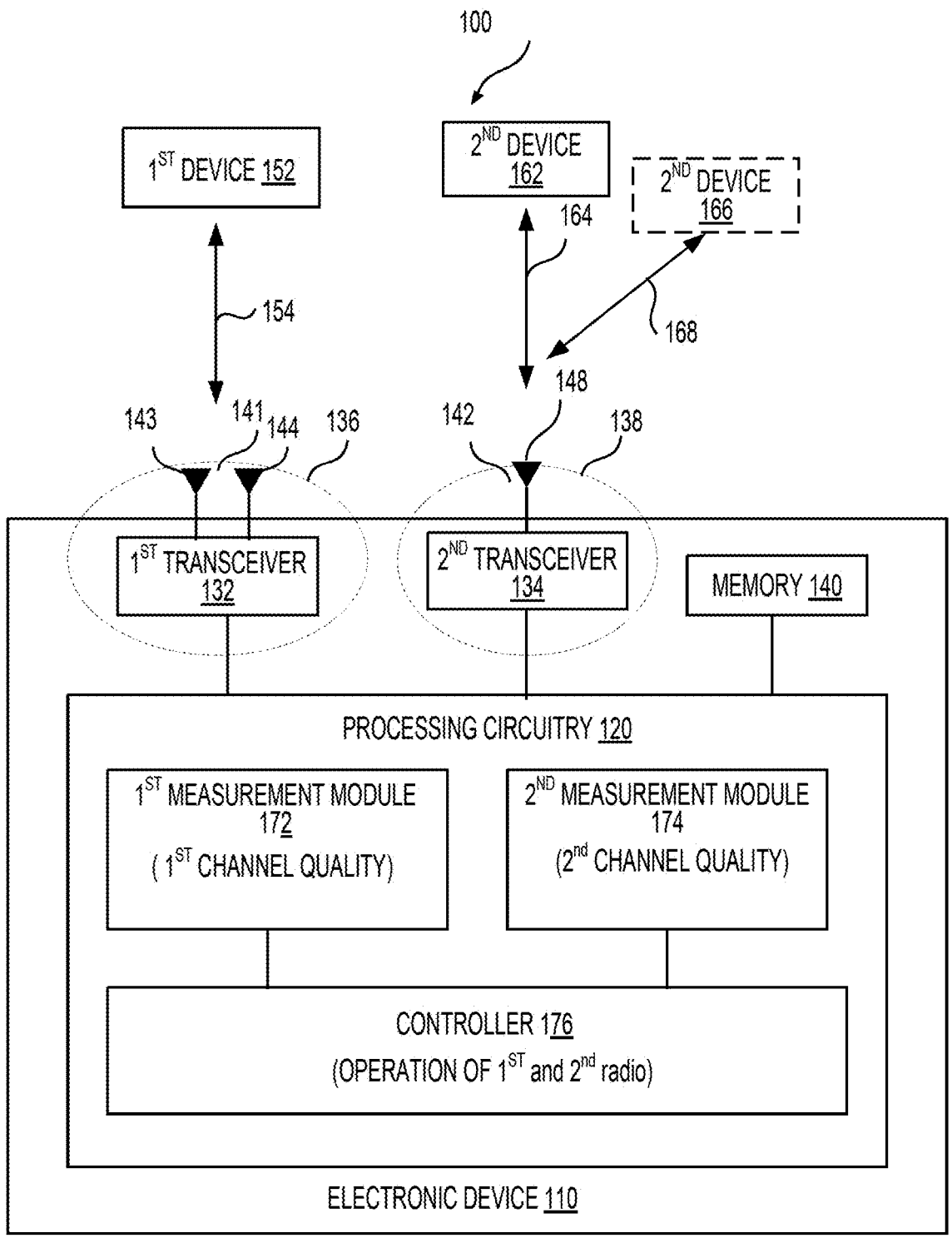
FIG. 1 shows a block diagram of a wireless communication system 100 according to an embodiment of the disclosure.

FIG. 1 shows a block diagram of a wireless communication system (referred to as a system) 100 according to an embodiment of the disclosure. The system 100 includes an electronic device 110 that wirelessly communicates with one or more devices, such as a first device 152 and a second device 162. The electronic device 110 includes processing circuitry 120, a first radio 136, a second radio 138, and a memory 140. The first radio 136 is configured to communicate with the first device 152 via a first wireless communication channel (referred to as a channel) 154 using a first radio access technology (RAT), and the second radio 138 is configured to communicate with the second device 162 via a second channel 164 using a second RAT. In some examples, the first radio 136 and the second radio 138 operate concurrently, thus, causing interference between the first radio 136 and the second radio 138. According to aspects of the disclosure, in order to reduce the interference, the processing circuitry 120 is configured to determine a channel quality of at least one of the first channel 154 and the second channel 164, and dynamically control operations of at least one of the first radio 136 and the second radio 138 based on the channel quality. According to aspects of the disclosure, the processing circuitry 120 is configured to determine a first parameter indicating a first interval between transmissions of control packets transmitted by the first radio 136. Further, the processing circuitry 120 determines a size limit for future packets to be received by the second radio 138 based on the first parameter. Subsequently, the second radio 138 transmits information indicating the size limit to the second device 162 so that sizes of the future packets from the second device 162 are such that the packets are received by the second radio 138 in a time period that is within the first interval. In various embodiments, packets collision between the control packets transmitted by the first radio 136 and the packets received by the second radio 138 is decreased, reducing the interference.

The system 100 can be configured to include multiple wireless networks, such as a wireless personal area network (WPAN), a wireless local area network (WLAN), a wireless wide area network (WWAN), a mobile backbone network, a corporate network, a backbone network, and the like, where multiple RATs are employed. For example, the system 100 can include a Bluetooth (BT) network, a WiFi network, a $3^{rd}$ generation (3G) cellular network, a $4^{th}$ generation (4G) cellular network, a long term evolution (LTE) cellular network, a $5^{th}$ generation (5G) cellular network, and the like.

The electronic device 110 can be any suitable electronic device configured to wirelessly communicate with one or more devices via, for example, multiple RATs. In various examples, the electronic device 110 is configured to wirelessly communicate with multiple devices via multiple RATs concurrently. In an example, the first RAT is a WLAN RAT, such as an 802.11x RAT, and the second RAT is a BT RAT. The electronic device 110 can be a computer, a portable electronic device, a wearable electronic device, and the like.

For example, a computer can be a portable computer (e.g., a laptop, notebook, a tablet computer), a desktop computer, a workstation, a computer server, and the like. A portable electronic device can be a portable phone, a media player, a personal data organizer, a handheld game platform, a smartphone, a cell phone, and the like. A wearable electronic device can be a smart watch, a smart activity tracker, and the like.

The first radio 136 is configured to transmit/receive wireless signals to/from the first device 152 using any suitable RAT, and the second radio 138 is configured to transmit/receive wireless signals to/from the second device 162 using any suitable RAT. A suitable RAT can be a BT RAT, a WLAN RAT, a 3G RAT, a 4G RAT, an LTE RAT, a 5G new radio (NR) technology, and the like. In an embodiment, the first radio 136 and/or the second radio 138 are configured to communicate with multiple devices, for example, using multiple channels. In some examples, such as shown in FIG. 1, the electronic device 110 is configured to form a Bluetooth piconet with the second device 162 and another second device 166, and the electronic device 110 is a master device of the Bluetooth piconet.

In an embodiment, the first radio 136 includes a first transceiver 132 and a first antenna structure 141, and the second radio 138 includes a second transceiver 134 and a second antenna structure 142. The first transceiver 132 includes a first transmitter and a first receiver. The first transmitter is configured to transmit packets including data packets and control packets. In various examples, the control packets include acknowledgement packets (ACKs), negative acknowledgement packets (NACKs), action frames, beacon frames, and the like, for example, depending on the first RAT. Certain control packets, such as ACKs, NACKs, and the like, are relatively short in duration. Similarly, the second transceiver 134 includes a second transmitter and a second receiver, and transmits packets including data packets and control packets.

Each of the first antenna structure 141 and the second antenna structure 142 can include one or more antennas arranged in any suitable configuration, such as one antenna, multiple antennas in a multiple-input and multiple-output (MIMO) configuration, and the like. For example, the first antenna structure 141 includes two antennas 143 and 144, and the second antenna structure 142 includes an antenna 148, as shown in FIG. 1. In general, the first antenna structure 141 is isolated from the second antenna structure 142. In an example, isolation between the first and second antenna structure 141 and 142 is between 20 to 40 decibel (dB). In an example, an isolation between the antenna 148 and the antenna 143 is larger than an isolation between the antenna 148 and the antenna 144.

In general, a channel quality of a channel can be indicated with one or a combination of channel indicators, such as a received signal strength indicator (RSSI), a frame error rate (FER), a signal to noise ratio (SNR), a noise floor (NF), and the like. Referring to FIG. 1, the first channel 154 is between the first radio 136 and the first device 152. In general, the first channel 154 is symmetric, thus, a first channel quality of the first channel 154 can be measured at the first radio 136 and/or at the first device 152. Further, the first channel quality can also be communicated between the first radio 136 and the first device 152 using any suitable methods. Similarly, a second channel quality of the second channel 164 can be measured at the second radio 138 and/or at the second device 162. Further, the second channel quality can also be communicated between the second radio 138 and the second device 162 using any suitable methods. According to aspects of the disclosure, the processing circuitry 120 includes a first measurement module 172 and a second measurement module 174 configured to determine one or more channel indicators described above, thus, determining the first channel quality and/or the second channel quality. In an example, the first measurement module 172 is configured to determine the first channel quality, and the second measurement module 174 is configured to determine the second channel quality.

The processing circuitry 120 includes a controller 176 configured to control operations of the first radio 136 and the second radio 138. The controller 176 is configured to adjust settings of the first transceiver 132, such as a first transmit power of the first transmitter, first receiver settings including a receiver gain, such as a gain of a low noise amplifier (LNA) in the first receiver. In general, the first receiver is more sensitive and less selective to received signals when the receiver gain increases. The controller 176 is configured to adjust settings of the first antenna structure 141. When the first antenna structure 141 includes multiple antennas, the controller 176 is configured to select a subset of the multiple antennas to transmit certain control packets based on respective isolations between the multiple antennas and the second antenna structure 142. In some embodiments, the controller 176 is similarly configured to adjust settings of the second antenna structure 142, the second transceiver 134, and the like.

According to aspects of the disclosure, the controller 176 is configured to dynamically control the operations of the first radio 136 and/or the second radio 138 based on the first channel quality and/or the second channel quality to reduce the interference between the first radio 136 and the second radio 138. In various embodiments, the first radio 136 is transmitting first packets over the first channel 154 and the second radio 138 is receiving second packets over the second channel 164 simultaneously, thus, the first packets can result in packet collision with the simultaneously received second packets at the second receiver, causing the interference from the first radio 136 to the second radio 138. Therefore, the first radio 136 is referred to as an aggressor radio, and the second radio 138 is referred to as a victim radio. Accordingly, in a first example, the controller 176 is configured to lower the first transmit power when the first channel quality satisfies a certain condition. In a second example, when the first channel quality satisfies a certain condition, a single antenna that has a largest isolation from the second antenna structure 142 can be used to transmit certain control packets, such as ACKs, NACKs, action frames, beacon frames, and the like when the first antenna structure 141 includes multiple antennas. In a third example, the controller 176 is configured to adjust receiver settings of the second transceiver 134, such as a receiver gain in the second transceiver 134, based on the second channel quality. For example, when the second channel quality improves, the controller 176 lowers the receiver gain to decrease a sensitivity and increase a selectivity to received signals, thus, reducing the interference from the first radio 136.

In a fourth example, the first measurement module 172 is configured to determine the first parameter indicating the first interval between the transmissions of the control packets transmitted by the first radio 136. Subsequently, the controller 176 determines the size limit for future packets to be received by the second radio 138 based on the first parameter. The second radio 138 then transmits the information indicating the size limit to the second device 162 so that the sizes of the future packets from the second device 162 are such that the packets are received by the second radio 138 in the time period that is within the first interval, reducing the interference.

In general, in addition to those described above, the processing circuitry 120 including the first measurement module 172, the second measurement module 174, and the controller 176 can be suitably configured to reduce the interference between the first radio 136 and the second radio 138, under various wireless communication scenarios (referred to as scenarios). For example, in a first scenario, the first radio 136 is an aggressor radio, and the second radio 138 is a victim radio, as described above. In a second scenario, the second radio 138 is transmitting packets over the second channel 164 and the first radio 136 is receiving packets over the first channel 154 simultaneously, thus, causing interference from the second radio 138 to the first radio 136. Therefore, the second radio 138 is an aggressor radio, and the first radio 136 is a victim radio. In a third scenario, both the first and second radio 136 and 138 are transmitting packets simultaneously. In a fourth scenario, both the first and second radio 136 and 138 are receiving packets simultaneously. In some examples, the first channel quality and the second channel quality are determined, and the operations of the first radio 136 and the second radio 138 are controlled.

The electronic device 110 includes a memory 140. The memory 140 can be any suitable device for storing data and instructions to control the operations of the electronic device 110. In an example, the memory 140 stores predefined parameters and instructions associated with operations of the first radio 136 and the second radio 138, and software instructions to be executed by a processor, such as the processing circuitry 120. In an example, the predefined parameters include conditions and various thresholds, such as RSSI thresholds, FER thresholds, SNR thresholds, SNR headroom, and the like. The memory 140 can store calibration data, measurement results indicating the first and second channel quality, the first interval, the first packet size, and the like.

The memory 140 can include non-volatile memory, volatile memory, and a suitable combination of non-volatile and volatile memory, such as read-only memory, flash memory, magnetic computer storage devices, hard disk drives, solid state drives, floppy disks, and magnetic tape, optical discs, a random access memory (RAM), and the like.

In an embodiment, the processing circuitry 120 is implemented using a suitable combination of hardware components, software components, firmware components, and the like. The processing circuitry 120, the first radio 136, the second radio 138, and the memory 140 can be coupled using any suitable technologies including wired connections, bus connections, wireless connections, and the like. Further, the first measurement module 172, the second measurement module 174, and the controller 176 can be coupled using any suitable technologies including wired connections, bus connections, wireless connections, and the like.

In the first scenario as described above, during operation, the first radio 136 is transmitting the first packets over the first channel 154 and the second radio 138 is receiving the second packets over the second channel 164 simultaneously. The received second packets can be distorted due to the interference to the second radio 138 from the first radio 136. As described above, the operations of the first radio 136 and/or the second radio 138 are suitably controlled to reduce the interference, thus mitigating packet distortion for the second radio 138.

As described in the first example, during operation, the first channel quality is determined. Specifically, the first measurement module 172 determines a RSSI of the first channel 154 based on packets received by the first radio 136. The first measurement module 172 further determines a FER of the first channel 154 based on the first packets transmitted by the first transmitter and ACKs received by the first receiver.

In an embodiment, the controller 176 compares the first channel quality with a certain condition, such as a predefined condition. When the first channel quality satisfies the condition, then the controller 176 decreases the first transmitter power of the first transmitter to reduce the interference of the first transmitter to the second radio 138. The condition can include certain RSSI thresholds and FER thresholds. In an example, the condition including the RSSI threshold and the FER threshold is stored in the memory 140. Alternatively, the condition is received via signaling to the electronic device 110. Specifically, the controller 176 compares the measured RSSI and FER with the respective RSSI and FER threshold. In an example, when the measured RSSI is larger than the RSSI threshold and the measured FER is less than the FER threshold, the controller 176 reduces the present transmit power $P_0$ of the first transmitter by a certain amount. Otherwise, the present transmit power $P_0$ is unchanged.

As described in the second example, the first antenna structure 141 includes multiple antennas, such as the antenna 143 and 144. In an example, isolations between the antenna 148 and the multiple antennas are determined during calibration or configuration of the electronic device 110, and the isolation information is stored in the memory 140. In an example, the isolation information includes numeric values in dB of the isolations between the antenna 148 and the multiple antennas, respectively. In an example, the isolation information includes a list ranking the isolations between the antenna 148 and the multiple antennas, respectively. Alternatively, isolation information includes one or more antennas that have the largest isolation from the antenna 148. In an example, the isolation information includes a suitable combination of the isolation information described above.

During operation, the first channel quality, such as the RSSI, is determined, and the operation of the first antenna structure 141 is controlled based on the first channel quality. The controller 176 compares the measured RSSI with a RSSI threshold. When the measured RSSI is larger than the RSSI threshold, the controller 176 selects a single antenna to transmit certain control packets, such as ACKs, NACKs, and the like. Otherwise, all the multiple antennas in the first antenna structure 141 are used to transmit the certain control packets. Note that, out of all the multiple antennas in the first antenna structure 141, the selected single antenna has the largest isolation from the antenna 148. For example, the antenna 143 is more isolated from the antenna 148 than the antenna 144, thus, the antenna 143 is selected to transmit the certain control packets. Since the first channel quality is relatively good, and in general, the certain control packets are more robust than data packets, transmitting the certain control packets with the single antenna reduces the interference to the antenna 148 while maintaining a suitable quality of the transmitted control packets.

In some embodiments, the first radio 136 communicates with the first device 152 and additional devices (not shown) via at least one additional channel using the first RAT, and the first radio 136 transmits signals over the first channel 154 and the at least one additional channel when the second radio receives packets over the second channel 164. The processing circuitry 120 is suitably adapted, for example, to determine at least one additional channel quality of the at least one additional channel, and dynamically control the operations of the first radio 136 according to the first channel quality and the at least one additional channel quality. In an example, the first transmit power is adjusted individually for the first channel and the at least one additional channel, respectively. In an example, the first transmit power is adjusted based on an average of the first channel quality and the at least one additional channel quality.

In some embodiments, the electronic device 110 includes at least one additional radio, such as a third radio (not shown) that forms a third channel using a third RAT. In an example, when the at least one additional radio, such as the third radio, also transmits packets in addition to the first radio 136, the third channel quality is determined, and the operations of the third radio is dynamically controlled by the processing circuitry 120 to reduce interference caused by the third radio to the second radio 138. The operations of the third radio are controlled similarly as described above.

As described in the third example, during operation, the second channel quality, such as a SNR, of the second channel 164 is determined, by the second measurement module 174, based on packets received by the second receiver. In some embodiments, a SNR margin is determined based on a difference between the SNR and a pre-determined value. The controller 176 controls the operations of the second receiver based on the measured SNR. For example, when the SNR increases indicating that the second channel quality is better, the controller 176 is configured to reduce a sensitivity and increases a selectivity of the second receiver by reducing, for example, a receiver gain of the second receiver. As a result, the second receiver is more robust against the interference from the first radio 136. On the other hand, when the SNR decreases, indicating that the second channel quality is worse, the controller 176 is configured to increase the sensitivity and decreases the selectivity by increasing, for example, the receiver gain of the second receiver. In an example, the controller 176 controls the operations of the second receiver based on the measured SNR and the isolation between the first and second antenna structure.

As described in the fourth example, during operation, the first measurement module 172 determines the first parameter indicating the first interval between transmissions of control packets transmitted by the first transmitter. Further, the controller 176 determines the size limit for future packets to be received by the second receiver based on the first parameter. For example, the size limit does not exceed the first interval. Subsequently, the second transceiver 134 transmits, for example, the information indicating the size limit to the second device 162 over the second channel 164. In an example, the second device 162 can subsequently transmit packets having sizes that are less than the size limit to the second transceiver 134. In various embodiments, sizes of the received packets by the second transceiver 134 are such that the packets are received by the second transceiver 134 in the time period that is within the first interval, reducing potential packet collision between the transmitted control packets and the received packets, thus, reducing the interference caused by the first transmitter.

Figure 2:
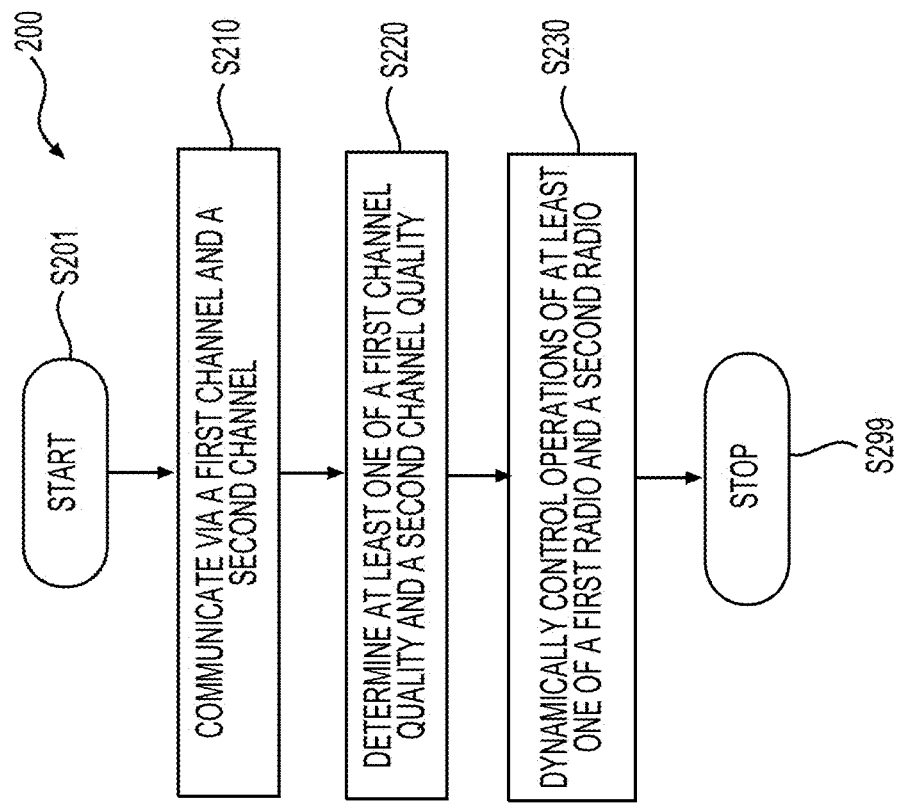
FIG. 2 shows a flow chart outlining a process 200 according to an embodiment of the disclosure.

FIG. 2 shows a flow chart outlining a process 200 according to an embodiment of the disclosure. In an example, the process 200 is executed by an electronic device configured to wirelessly communicate with one or more devices using multiple RATs simultaneously, such as the electronic device 110 in the FIG. 1 example. The electronic device includes a first radio and a second radio. The process 200 starts at S201, and proceeds to S210.

At S210, the first radio communicates with a first device via a first channel using a first RAT and the second radio communicates with a second device via a second channel using a second RAT. In an example, the first RAT is a WiFi RAT and the second RAT is a BT RAT. Accordingly, the first radio is compliant to a WiFi standard, the first channel is a WiFi channel, the second radio is compliant to a BT standard, and the second channel is a BT channel.

In an example, the first radio transmits first packets via the first channel to the first device, and the second radio receives second packets via the second channel from the second device simultaneously, resulting in interference of the first radio to the second radio.

At S220, at least one of a first channel quality of the first channel and a second channel quality of the second channel is determined, for example, by processing circuitry of the electronic device, such as the processing circuitry 120, the first measurement module 172, and the second measurement module 174 in the FIG. 1 example, as described above.

At S230, operations of at least one of the first radio and the second radio are dynamically controlled based on the at least one of the first channel quality and the second channel quality, for example, by the processing circuitry to reduce the interference of the first radio to the second radio.

In an example, the at least one of the first channel quality and the second channel quality determined at S220 is the first channel quality, and the first channel quality is determined to satisfy a condition, then a first transmit power of the first radio is dynamically reduced, or a single antenna of the first radio is selected to transmit certain control packets.

In an example, the at least one of the first channel quality and the second channel quality determined at S220 is the second channel quality, then receiver settings of the second radio are dynamically adjusted based on the second channel quality. For example, when the second channel quality is better, the receiver settings are adjusted to decrease a sensitivity and increase a selectivity of the second radio to received signals.

The process 200 then proceeds to S299, and terminates.

The specific operations of the first radio and the second radio can be suitably adapted, varied, and/or combined according to the first channel quality and the second channel quality, the condition, and the like. Some embodiments are shown below in FIGS. 3-5.

Figure 3:
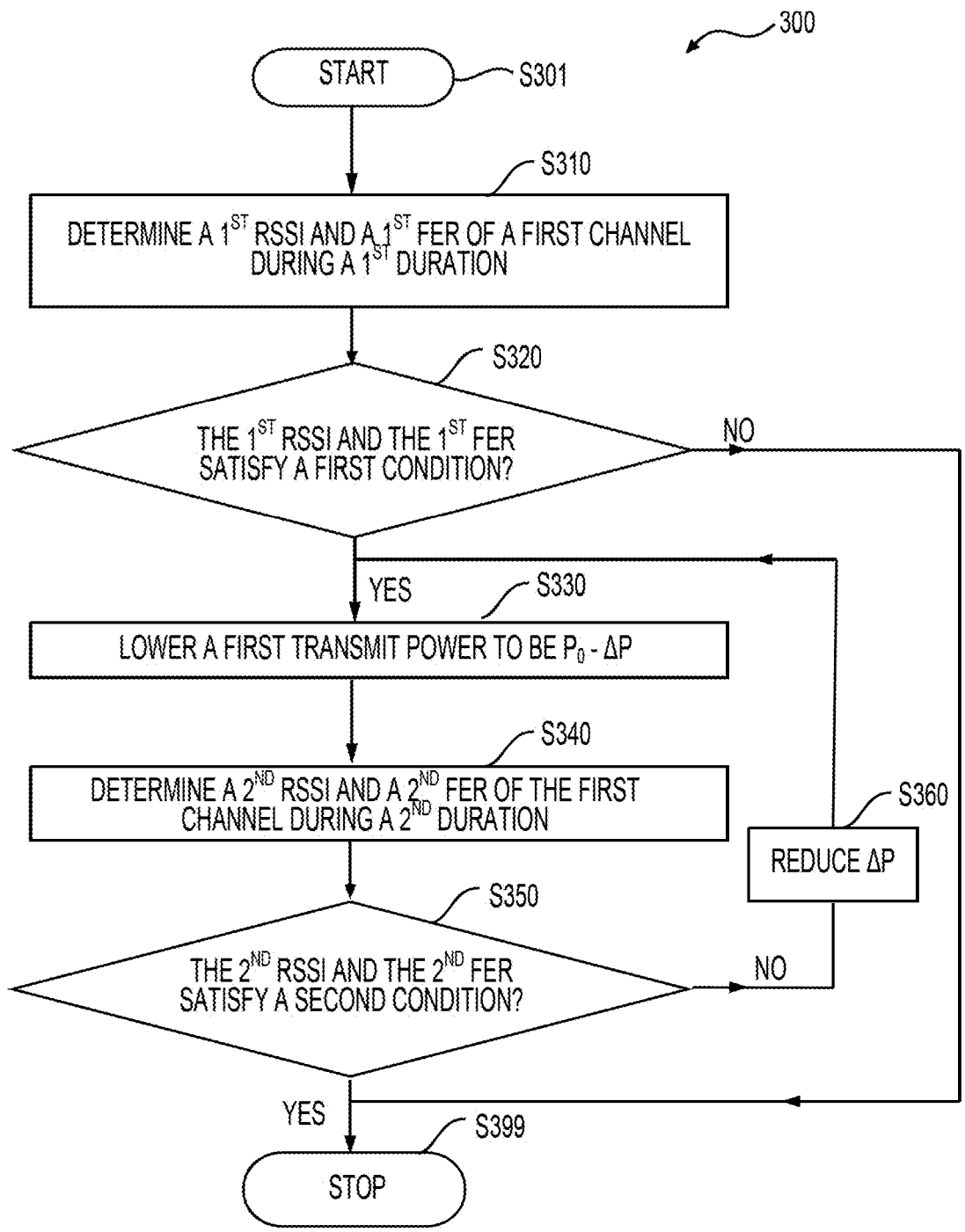
FIG. 3 shows a flow chart outlining a process 300 according to an embodiment of the disclosure.

FIG. 3 shows a flow chart outlining a process 300 according to an embodiment of the disclosure. In an example, the process 300 is executed by an electronic device configured to wirelessly communicate with one or more devices using multiple RATs simultaneously, such as the electronic device 110 in the FIG. 1 example. The electronic device includes a first radio and a second radio. The electronic device is configured similarly or identically to the electronic device described in FIG. 2.

The process starts at S301 that is similar or identical to S210 in FIG. 2, thus, the detailed description is omitted for purposes of clarity. Note that the first radio transmits first packets via the first channel to the first device. In an example, the first radio includes a first transceiver having a first transmitter and a first receiver. At S301, the first radio operates under a normal rate adaptation where a transceiver rate is determined by a lower limit of a transmitter rate and a receiver rate of the first transceiver.

At S310, an initial channel quality of the first channel is determined in a first duration, for example, by processing circuitry of the electronic device, such as the processing circuitry 120 in the FIG. 1 example. The initial channel quality includes, for example, signal strength and packet error rate of signals received by the first device. In general, the first channel is symmetric, thus, the initial channel quality includes a first RSSI and a first FER determined by the electronic device in the first duration that lasts, for example, 10 milliseconds (ms). In an example, the initial channel quality is measured by a measurement circuit, such as the first measurement module 172 in the FIG. 1 example.

The normal rate adaptation is disabled, and a timer lasting the first duration starts. Subsequently, RSSIs and the first FER are measured before the timer expires. In an embodiment, a RSSI is measured based on control packets and data packets received by the first receiver from the first device. In an example, the first RSSI is calculated based on the RSSIs, such as by averaging the RSSIs. The first FER is determined based on a first number of the first packets transmitted, a second number of the first packets whose reception by the first device is acknowledged by the ACKs, and a third number of the first packets that will be retransmitted. The first, the second, and the third number are measured by the measurement circuit. When the timer expires, the normal rate adaptation is enabled. In some examples, the first radio is a WiFi compliant radio, determination of the RSSI and FER is implemented by a physical (PHY) layer and a media access control (MAC) layer of a protocol stack of the electronic device.

At S320, whether the initial channel quality satisfies a first condition is determined by, for example, comparing the first RSSI and the first FER with a RSSI threshold and a FER threshold, respectively. RSSI thresholds and FER thresholds depend on types of packets, modulation schemes used for packets, and the like. In an example, RSSI thresholds and FER thresholds (or acceptable FERs) are pre-determined and stored in the electronic device, such as the memory 140. For example, the RSSI thresholds and the FER thresholds are stored as a table.

In an example, when the first RSSI is larger than the RSSI threshold and the first FER is less than the FER threshold, the initial channel quality is determined to satisfy the first condition. Accordingly, a value $\Delta P = \Delta P_0$ where $\Delta P_0$ is a predetermined value for power reduction. The process 300 proceeds to S330. Otherwise, the process 300 proceeds to S399, and terminates.

At S330, a present transmit power $P_0$ is lowered to a temporary transmit power $P_1$, and the temporary transmit power $P_1 = P_0 - \Delta P$. Subsequently, the first transmitter is configured, for example, by a controller, such as the controller 176 in the FIG. 1 example, to transmit using the temporary transmit power $P_1$. In an example, the present transmit power $P_0$ is stored prior to being changed.

At S340, a subsequent channel quality of the first channel, for example, a second RSSI and a second FER, is determined in a second duration, similar to that described at S310.

At S350, whether the subsequent channel quality, such as the second RSSI and the second FER, satisfies a second condition is determined, similar to that of the S320. Similarly, when the second RSSI is larger than a second RSSI threshold and the second FER is less than a second FER threshold, the subsequent channel quality is determined to satisfy the second condition. Accordingly, the present transmit power $P_0$ is updated as $P_0 = P_1$. The process 300 proceeds to S399 and terminates. Otherwise, the process 300 proceeds to S360. In an example, the first condition, the first RSSI threshold, the first FER threshold are identical to the second condition, the second RSSI threshold, the second FER threshold, respectively.

At S360, a new value for $\Delta P$ is determined by reducing the current value of $\Delta P$, for example, by half. The process 300 then proceeds to S330.

In various examples, the process 300 is suitably adapted to repeat a subset of the steps, add certain steps, omit certain steps, and the like.

Figure 4:
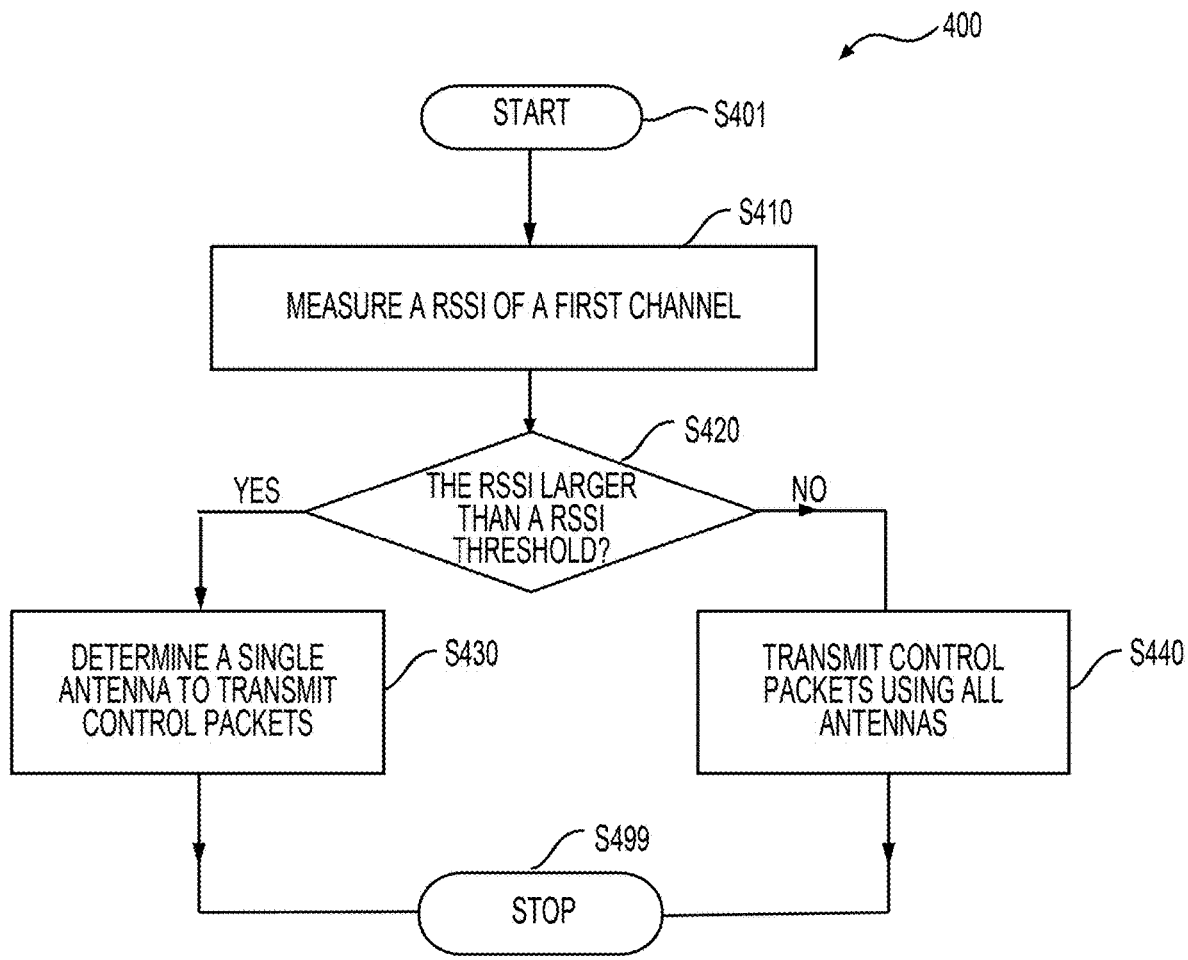
FIG. 4 shows a flow chart outlining a process 400 according to an embodiment of the disclosure.

FIG. 4 shows a flow chart outlining a process 400 according to an embodiment of the disclosure. In an example, the process 400 is executed by an electronic device configured to wirelessly communicate with one or more devices using multiple RATs simultaneously, such as the electronic device 110 in the FIG. 1 example. The electronic device includes a first radio and a second radio. The electronic device is configured similarly or identically to the electronic device described in FIG. 2.

The process starts at S401 that is similar or identical to S210 in FIG. 2, thus, the detailed description is omitted for purposes of clarity. Note that the first radio transmits first packets via the first channel to the first device. In an example, the first radio includes a first transceiver and a first antenna structure. The first antenna structure includes multiple antennas, such as the antennas 143 and 144 in the FIG. 1 example. In an example, isolations between the multiple antennas and a second antenna structure in the second radio are determined during calibration or configuration of the electronic device, and isolation information, similar or identical to that described above in FIG. 1, is stored in the electronic device, such as the memory 140 in the FIG. 1 example. In an example, a controller such as the controller 176 in the FIG. 1 example determines a single antenna that has a largest isolation from the second antenna structure based on the isolation information.

At S410, a first channel quality of the first channel is determined, for example, by processing circuitry of the electronic device, such as the processing circuitry 120, the first measurement module 172 in the FIG. 1 example. In an example, the first channel quality is determined periodically. The first channel quality includes, for example, a RSSI of signals received by the first transceiver. In an embodiment, the RSSI is measured based on control packets and data packets received by the first transceiver from the first device. In an example, the RSSI is an average of RSSIs over a certain duration. In an example, the RSSI is a single measurement prior to S420.

At S420, whether the first channel quality satisfies a condition is determined by comparing the RSSI with a RSSI threshold. In an example, the RSSI threshold is pre-determined and stored in the electronic device, such as the memory 140 in the FIG. 1 example. In an example, when the RSSI is larger than the RSSI threshold, the first channel quality is determined to satisfy the condition. Accordingly, the process 400 proceeds to S430. Otherwise, the process 400 proceeds to S440.

At S430, the single antenna is selected to transmit certain control packets, such as ACKs, NACKs, action frames, beacon frames, and the like. As described above, out of all the multiple antennas in the first antenna structure, the selected single antenna has the largest isolation from the second antenna structure. The process 400 proceeds to S499, and terminates. In an example, the RSSI threshold varies with the largest isolation.

At S440, all the antennas in the first antenna structure are used to transmit the certain control packets. The process 400 proceeds to S499, and terminates. In an example, the controller 176 in the FIG. 1 example is used to implement S430 and S440.

Figure 5:
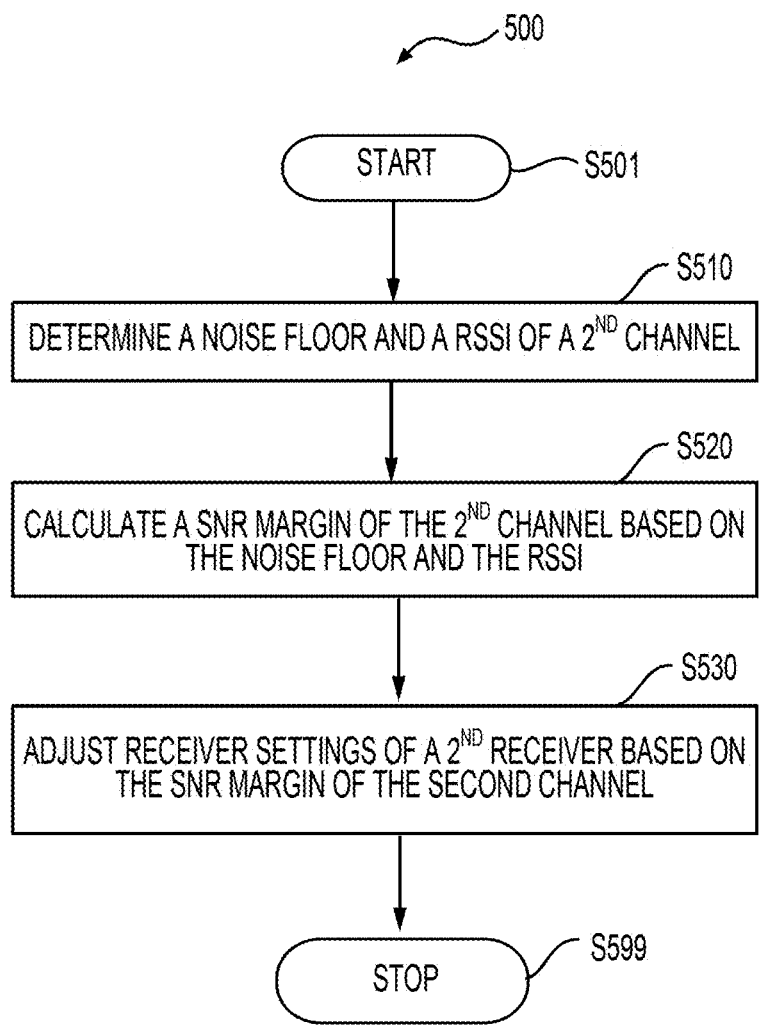
FIG. 5 shows a flow chart outlining a process 500 according to an embodiment of the disclosure.

FIG. 5 shows a flow chart outlining a process 500 according to an embodiment of the disclosure. In an example, the process 500 is executed by an electronic device configured to wirelessly communicate with one or more devices using multiple RATs simultaneously, such as the electronic device 110 in the FIG. 1 example. The electronic device includes a first radio and a second radio. The electronic device is configured similarly or identically to the electronic device described in FIG. 2.

Similar to S210 in FIG. 2, at S501, in an example, the first radio transmits first packets via the first channel to the first device, and the second radio receives second packets via the second channel from the second device simultaneously, resulting in interference of the first radio to the second radio. In an example, the second radio includes a second transceiver having a second transmitter and a second receiver.

At S510, a second channel quality indicated by, for example, an average noise floor (NF) and an average RSSI of the second channel is determined over a pre-defined duration (e.g., 10 ms), for example, by processing circuitry of the electronic device, such as the processing circuitry 120, the second measurement module 174 in the FIG. 1 example. In an example, the average RSSI is determined similarly as described above in reference to FIG. 3.

At S520, a SNR margin is calculated, for example, by a controller, such as the controller 176 in FIG. 1 example. In an example, an average SNR of the second channel is calculated based on the average RSSI and the average NF, for example, the average SNR=the average RSSI—the average NF. The SNR margin is calculated based on the average SNR, a SNR threshold, a SNR headroom, and the like. In an example, the SNR threshold refers to a minimal SNR for communicating packets over the second channel. The SNR threshold depends on types of packets, modulation types used for packets, and the like. When multiple modulation types are used, the SNR threshold corresponds to the highest SNR requirement. The SNR headroom refers to a safety margin added to the SNR threshold. In an example, the SNR threshold and the SNR headroom are pre-determined.

At S530, receiver settings of the second receiver are adjusted based on the SNR margin of the second channel. In an example, a controller such as the controller 176 in FIG. 1 example is used to implement S530. In an example, the receiver settings include receiver gains at various stages of the second receiver, such as a gain of an LNA. When the SNR margin increases, indicating that the second channel quality increases, the receiver settings are adjusted for better selectivity and less sensitivity for received signals, for example, by lowering the gain of the LNA. Otherwise, the receiver settings are adjusted for less selectivity and better sensitivity for the received signals, for example, by increasing the gain of the LNA.

In an example, when the SNR margin drops below a pre-determined margin threshold, the receiver settings are adjusted for a least selectivity and a best sensitivity for the received signals, for example, by maximizing the gain of the LNA.

In an example, adjustments of the receiver settings, or a balance between sensitivity and selectivity to the received signals, also depend on isolation between the first antenna structure and the second antenna structure in addition to the SNR margin. For example, for the same SNR margin, the receiver settings are adjusted for better selectivity and less sensitivity for received signals when the isolation is smaller.

The process 500 proceeds to S599, and terminates.

In some examples, adjustments of the receiver settings are based on the SNR instead of the SNR margin, thus, the process 500 is adapted accordingly.

Figure 6:
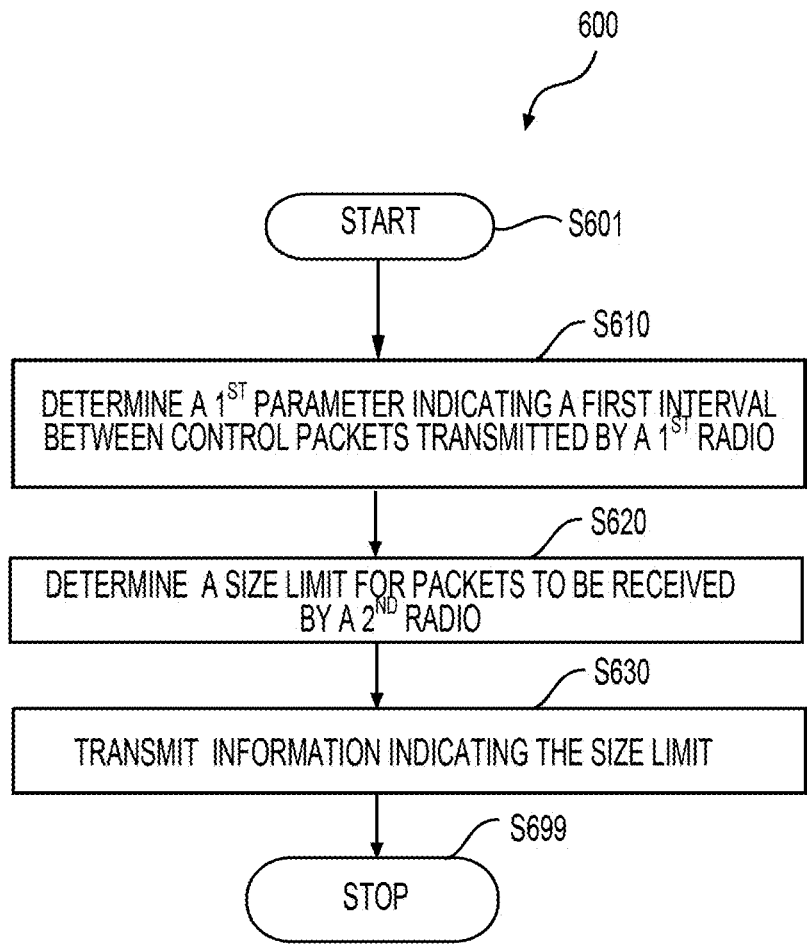
FIG. 6 shows a flow chart outlining a process 600 according to an embodiment of the disclosure.

FIG. 6 shows a flow chart outlining a process 600 according to an embodiment of the disclosure. In an example, the process 600 is executed by an electronic device configured to wirelessly communicate with one or more devices using multiple RATs simultaneously, such as the electronic device 110 in the FIG. 1 example. The electronic device includes a first radio and a second radio. The first radio forms a first channel with a first device using a first RAT and the second radio forms a second channel with a second device using a second RAT. In an example, the first RAT is a WiFi RAT and the second RAT is a BT RAT. Accordingly, the first radio is compliant to a WiFi standard, the first channel is a WiFi channel, the second radio is compliant to a BT standard, and the second channel is a BT channel. In an example, the first radio includes a first transceiver having a first transmitter and a first receiver, and the second radio includes a second transceiver having a second transmitter and a second receiver.

The process 600 starts at S601. In an example, the first radio transmits first packets via the first channel to the first device, and the second radio receives second packets via the second channel from the second device simultaneously, resulting in interference of the first radio to the second radio.

At S610, a first parameter indicating a first interval between control packets transmitted by the first transmitter in the first radio is determined. In an embodiment, the first interval is an averaged interval between the adjacent control packets. In an example, intervals between adjacent ACKs and NACKs are determined over a pre-defined duration, and the first interval is determined by averaging the intervals by a MAC layer in a protocol stack of the electronic device. In an example, a measurement circuit such as the first measurement module 172 in FIG. 1 example is used to measure the first interval. In an example, the first interval is determined to be 2 ms.

In an embodiment, the first parameter is determined to be a temporal duration associated with the first interval, such as the first interval T, twice of the first interval (2T), and the like. In an example, the first parameter is determined to be a frequency associated with the first interval, such as 1/T and the like.

At S620, a size limit for future packets to be received by the second receiver is determined based on the first parameter. In an embodiment, a controller, such as the controller 176 in FIG. 1 example, implements S620. In various embodiments, the size limit sets a maximal packet size for the future packets. In some embodiments, the size limit sets a maximal temporal duration for individual future packets. In various examples, the size limit is less than the first interval by a predefined duration, a predefined number of bits, and the like. In an example, the predefined duration is equal to or larger than a temporal duration of an ACK. In some examples, the size limit is determined based on the first interval, sizes of the control packets, and a size margin that is determined by the second RAT. In an example, the first interval is a sum of the size limit, an averaged size of the control packets, and the size margin.

Accordingly, in various examples, the individual future packets received by the second radio can be fitted within the first interval, avoiding certain packet collisions with the control packets that are separated, on average, by the first interval. In an example, the first interval is 2 ms, thus, the size limit is determined to be 3 slots for the BT RAT where one slot lasts 0.625 ms, thus, a maximal length for packets transmitted by the second device is 3 slots. In another example, when the first interval is 2 ms, the size limit is determined to be 1 slot for the BT RAT, thus, the maximal length for the packets transmitted by the second device is 1 slot.

At S630, information indicating the size limit is transmitted by the second transceiver, for example, to the second device over the second channel. In an example, the controller instructs the second transceiver to transmit the information. In an example, the second device subsequently adjusts packet sizes, and transmits packets having sizes less than the size limit to the second transceiver. As a result, sizes of the received packets by the second transceiver are such that the packets are received by the second transceiver in a time period that is within the first interval, reducing potential packet collision between the transmitted control packets and the received packets, thus, reducing the interference caused by the first transmitter. In various examples, the time period corresponds to the size limit. For example, when the size limit is determined to be 3 slots for the BT RAT where one slot lasts 0.625 ms, the time period is 1.875 ms.

The process 600 then proceeds to S699, and terminates.

Figure 7:
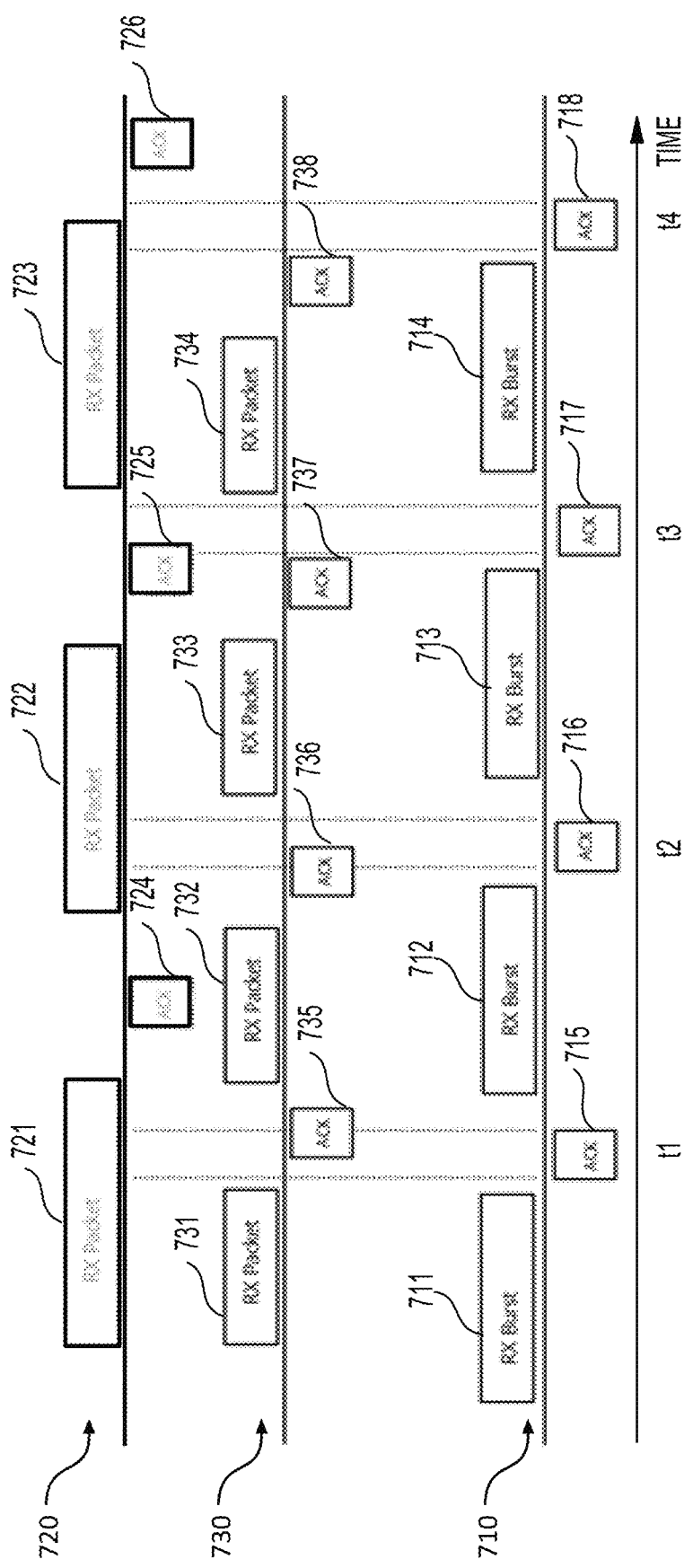
FIG. 7 shows an example of transmission and reception of signals by an electronic device according to an embodiment of the disclosure.

FIG. 7 shows an example of transmission and reception of signals by an electronic device, such as the electronic device 110 in the FIG. 1 example, according to an embodiment of the disclosure. The electronic device includes a first radio and a second radio. The first radio communicates with a first device via a first channel using a first RAT and the second radio communicates with a second device via a second channel using a second RAT. In an example, the first RAT is a WiFi RAT and the second RAT is a BT RAT. Accordingly, the first radio is compliant to a WiFi standard, the first channel is a WiFi channel, the second radio is compliant to a BT standard, and the second channel is a BT channel. In an example, the first radio includes a first transceiver having a first transmitter and a first receiver, and the second radio includes a second transceiver having a second transmitter and a second receiver. In an example, the first radio transmits first packets via the first channel to the first device, and the second radio receives second packets via the second channel from the second device simultaneously, resulting in interference of the first radio to the second radio.

As shown, the X-axis represents time while the Y-axis represents the transmission and reception of signals by the first radio (row 710) and the second radio (rows 720 and 730), respectively.

Row 710 shows packets 711-714 received by the first radio, and ACKs 715-717 transmitted by the first radio to acknowledge receptions of the packets 711-714, respectively.

Row 720 shows packets 721-723 received by the second radio when packet sizes of the packets 721-723 are not controlled. As shown by row 720, the received packets 721-723 collides with the transmitted ACKs 715, 716, and 718, resulting in packet distortion. Therefore, the process 600 is used to reduce the packet distortion caused by, for example, interference from the first radio to the second radio, as described above in reference to FIG. 6. Note that ACKs 724-726 are transmitted by the second radio to indicate receptions of the packets 721-723.

Accordingly, row 730 shows packets 731-734 received by the second radio when packet sizes of the packets 731-734 are controlled using the process 600, thus, the packet sizes are less than the first interval. Therefore, the received packets 731-734 do not collide with the transmitted ACKs 715-718, reducing the interference of the first radio to the second radio and the packet distortion.

Comparison of row 710 and row 730 shows that when the size limit becomes smaller, the interference is further reduced, thus the received packets 731-734 are less likely to collide with the transmitted ACKs 715-718, resulting in reduced packet distortion. However, a channel throughput can be reduced. In an example, the size limit is determined by the electronic device to optimize the channel throughput.

Figure 8:
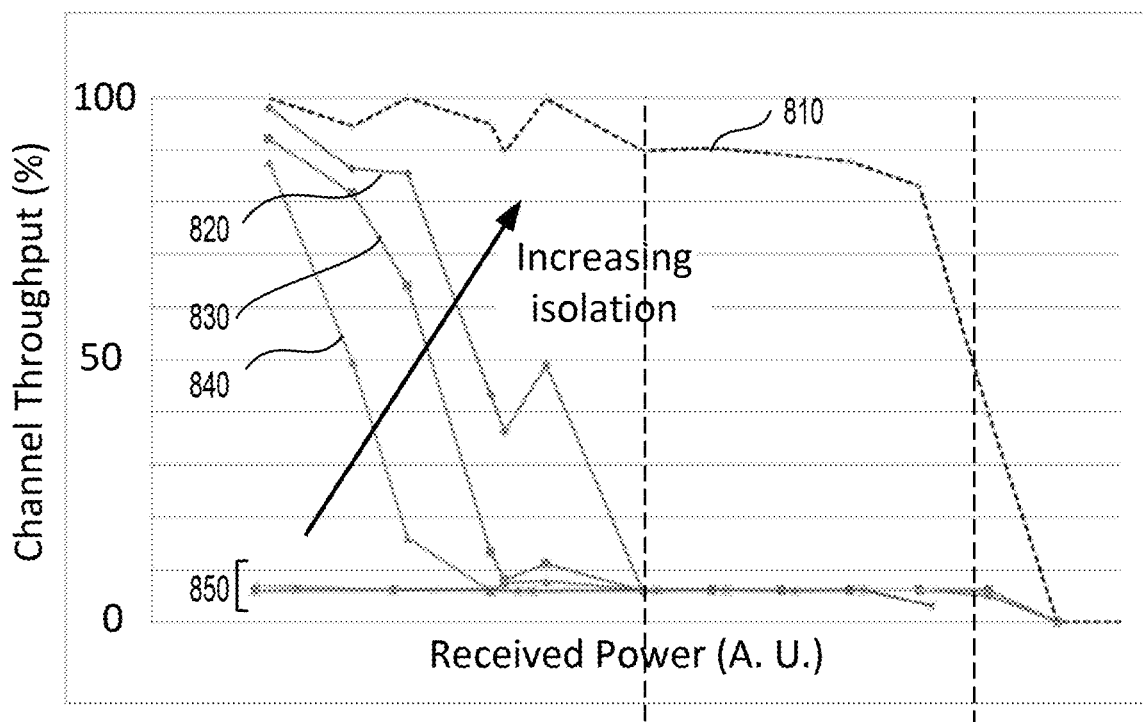
FIG. 8 shows an example when packet sizes of the second packets are not controlled according to an embodiment of the disclosure.
Figure 9:
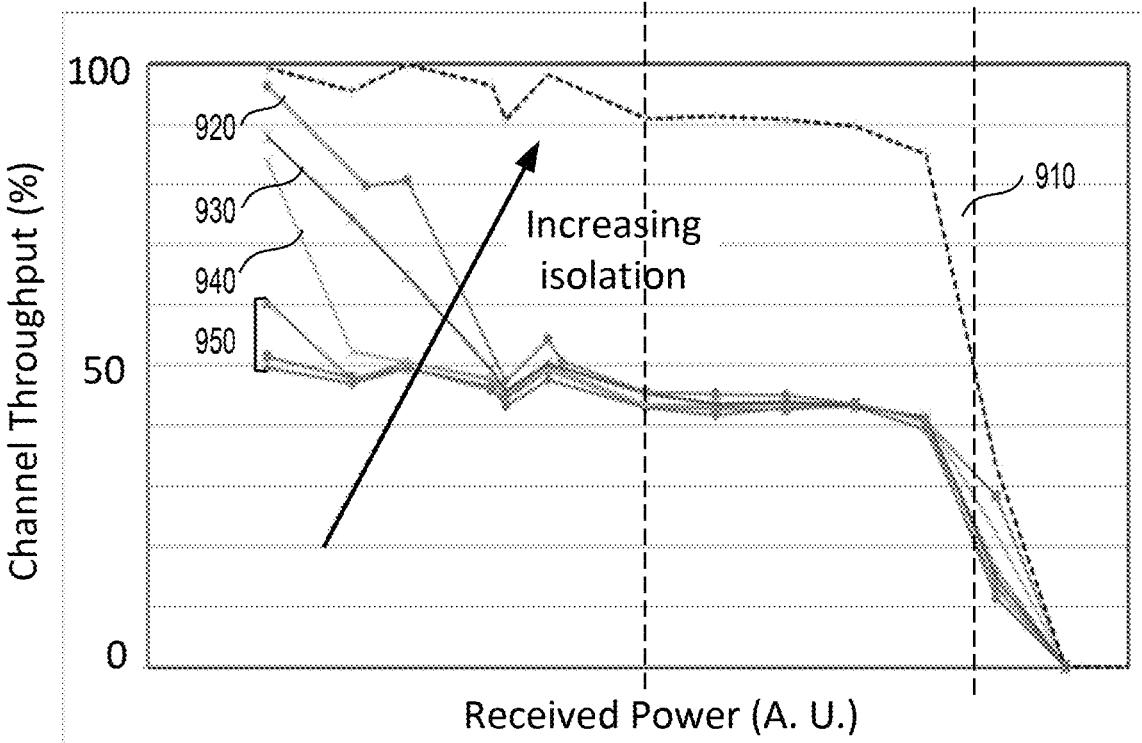
FIG. 9 shows an example when packet sizes of the second packets are controlled according to an embodiment of the disclosure.

FIGS. 8 and 9 show examples of an electronic device, such as the electronic device described in FIG. 1 example, the electronic device described in FIG. 6, and the like, implementing the process 600 according to aspects of the disclosure. Note that the second radio is a Bluetooth radio that receives second packets while the first radio, a WiFi radio, transmits ACKs after receiving packets. As shown, the X-axis represents a received power at the second receiver in arbitrary unit (A.U.) while the Y-axis represents a percentage of channel peak throughput of the second channel (referred to as a channel throughput). Note that the received power decreases from left to right along the X axis.

FIG. 8 shows the example when packet sizes of the second packets are not controlled according to an aspect of the disclosure. Line 810 shows the channel throughput when the first radio is off (i.e., baseline where there is no or minimal interference from the first radio, thus a first isolation between the first and the second radio is maximal), the channel throughput is close to 100% when the received power is larger than $P_{R1}$. When the first radio is on, the channel throughput decreases, for example, due to packet collisions, and a reduction of the channel throughput depends on the isolation between the first antenna structure and the second antenna structure. For example, lines 820-840 show the channel throughputs corresponding to a second isolation, a third isolation, and a fourth isolation between the first radio and the second radio, respectively. The first isolation is larger than the second isolation, the second isolation is larger than the third isolation, and the third isolation is larger than the fourth isolation. The lines 850 show the channel throughputs at and below a fifth isolation where the fifth isolation is less than the fourth isolation. As seen from FIG. 8, for a same received power, the channel throughout decreases when the isolation decreases. In addition, the channel throughput for the lines 820-850 drops below 10% when the received power is below $P_{R2}$.

However, when the packet sizes of the second packets are controlled using the process 600, the channel throughput is improved, as shown in FIG. 9. A line 910 shows the channel throughput when the first radio is off and is identical to the line 810. Lines 920-940 show the channel throughputs corresponding to the second isolation, the third isolation, and the fourth isolation, respectively. Lines 950 show the channel throughputs at and below the fifth isolation. FIG. 9 shows that the channel throughput is above 40% when the received power is $P_{R2}$. In general, for two lines having the same received power and the same isolation, such as the lines 840 and 940, the channel throughput for the line 940 is larger than that of the line 840. Therefore, suitably controlling the packet sizes of received packets by the second radio, as described in FIG. 6, improves the channel throughput by reducing the interference between the first and the second radio.

In general, each of the processes 200-600 can be suitably adapted by modifying one or more steps in the respective process, adding one or more steps, omitting one or more steps, and the like. For example, an additional step can be added where a selection of one or more specific processes is made in a process set including the processes 200-600.

In general, a plurality of the processes 200-600 can be suitably adapted and combined to reduce the interference, for example, between the first radio 136 and the second radio 138 as shown in FIG. 1. In an example, the processes 200 and 600 are combined to reduce the interference from the first radio 136 to the second radio 138 when the first radio 136 is an aggressor radio that transmits the first packets, and the second radio 138 is a victim radio that receives the second packets simultaneously as described above in the first scenario. Similarly, the processes 300 and 600, the processes 400 and 600, and the processes 500 and 600, can be adapted and combined to reduce the interference from the first radio 136 to the second radio 138 when the first radio 136 is an aggressor radio, and the second radio 138 is a victim radio.

As described above, the electronic device 110 in FIG. 1 example, is configured to implement the processes 200-600, respectively when the first radio 136 is an aggressor radio and the second radio 138 is a victim radio. In an embodiment, the electronic device 110 in FIG. 1 example can be suitably configured to implement processes similar to the processes 200-600 when the first radio 136 is a victim radio and the second radio 138 is an aggressor radio or in any other suitable scenarios.

In general, the electronic device 110 described in FIG. 1, can be suitably configured to implement any combination of a subset of the processes 200-600 as described above or suitably modified. For example, the electronic device 110 is suitably configured to implement the process 200 and 600.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for wireless communication, the method comprising:
   transmitting, by a first transceiver, control packets via a first wireless communication channel using a first radio access technology, wherein a respective control packet is transmitted for each data packet received;
   measuring, using a timer, an interval between successive transmissions of the control packets transmitted by the first transceiver, the control packets transmitted during a first duration;
   determining, by processing circuitry, a first parameter indicating a duration of the measured interval between the successive transmissions of the control packets over the first duration;
   determining, based on the first parameter, a size limit for any future packets to be received by a second transceiver during a second duration after the first duration which does not overlap with the first duration, the second transceiver receiving the packets via a second wireless communication channel using a second radio access technology; and
   transmitting, by the second transceiver, information indicating the size limit for any future packets to be received over the second wireless channel during the second duration wherein sizes of the packets to be received by the second transceiver are controlled by a remote transceiver using the second radio access technology to vary from less than the size limit maximally to the size limit based on the information such that the packets received by the second transceiver are sized to fit in a variable time period between separate transmissions of subsequent control packets transmitted by the first transceiver, the subsequent control packets transmitted and the packets received during the second duration; and the first transceiver and the second transceiver further arranged to transmit simultaneously over respective communication channels and receive simultaneously over respective communication channels during the second duration.

2. The method of claim 1, wherein determining the size limit is based on the first parameter, sizes of the control packets, and a size margin based on the second radio access technology.

3. The method of claim 1, further comprising:
   determining one or more channel indicators indicating at least one of a first channel quality of the first channel and a second channel quality of the second channel; and
   dynamically controlling, based on the at least one of the first channel quality and the second channel quality, operations of at least one of the first transceiver, a first antenna structure coupled to the first transceiver, the second transceiver, and a second antenna structure coupled to the second transceiver.

4. The method of claim 3, wherein the one or more channel indicators include a received signal strength indicator (RSSI) and a frame error rate (FER) of the first channel, the first transceiver includes a first transmitter, and the method further includes:
   determining the RSSI and FER based on signals transmitted and received by the first transceiver over the first channel;
   comparing the RSSI and FER with a pre-determined RSSI threshold and a predetermined FER threshold, respectively; and
   when the RSSI is determined to be larger than the RSSI threshold and the FER is determined to be less than the FER threshold, lowering a transmit power of the signals transmitted by the first transmitter over the first channel to reduce interference to the second transceiver.

5. The method of claim 3, wherein the one or more channel indicators include a RSSI of the first channel, the first antenna structure includes multiple antennas, and the method further includes:
   measuring the RSSI based on signals received by the first transceiver;
   comparing the RSSI with a pre-determined RSSI threshold; and
   when the RSSI is determined to be larger than the RSSI threshold, selecting a single antenna from the multiple antennas having a largest isolation from the second antenna structure to transmit the control packets to reduce interference to the second transceiver, the single antenna being one of the multiple antennas.

6. The method of claim 3, wherein the second transceiver includes a second receiver, and the method further includes:
   determining a signal to noise ratio (SNR) of the second channel; and
   adjusting receiver settings of the second receiver based on the SNR and a pre-determined isolation between the first antenna structure and the second antenna structure.

7. The method of claim 1, wherein the first radio access technology is a WiFi radio access technology, and the second radio access technology is a Bluetooth radio access technology.

8. The method of claim 1, wherein the control packets include acknowledgement packets (ACKs) and negative ACK packets (NACKs).

9. The method of claim 1, wherein the first parameter is an average measured interval between the transmissions of the control packets over the first duration and the size limit for packets to be received by the second transceiver is based on the average measured interval.

10. The method of claim 1, wherein a timing of the transmission of the packets received by the second transceiver is independent of a timing of transmission of the subsequent control packets by the first transceiver.

11. The method of claim 1, wherein the sizes of the packets to be received by the second transceiver during the second duration are further controlled by the remote transceiver to vary based only on the size limit, wherein only one packet having a size of the size limit is fit in the time period.

12. An electronic device for wireless communication, the electronic device comprising:
a first transceiver configured to communicate via a first channel using a first radio access technology;
a second transceiver configured to communicate via a second channel using a second radio access technology; and
processing circuitry configured to:
measure, using a timer, an interval between successive control packets transmitted by the first transceiver over a first duration, wherein each control packet is transmitted to indicate whether a respective data packet is received;
determine a first parameter indicating a duration of the measured interval between the successive transmissions of the control packets by the first transceiver, the control packets transmitted during the first duration;
determine, based on the first parameter, a size limit for any future packets to be received by the second transceiver during a second duration after the first duration which does not overlap with the first duration; and
transmit information via the second transceiver indicating the size limit for any future packets to be received over the second wireless channel during the second duration wherein sizes of the packets to be received by the second transceiver are controlled by a remote transceiver using the second radio access technology to vary from less than the size limit maximally to the size limit based on the information such that the packets are received by the second transceiver and the packets received by the second transceiver are sized to fit in a variable time period between individual transmissions of subsequent control packets transmitted by the first transceiver, the subsequent control packets transmitted and the packets received during the second duration; and the first transceiver and the second transceiver further arranged to transmit simultaneously over respective communication channels and receive simultaneously over respective communication channels during the second duration.

13. The electronic device of claim 12, wherein the processing circuitry is configured to:
determine the size limit based on the first parameter, sizes of the control packets, and a size margin based on the second radio access technology.

14. The electronic device of claim 12, wherein the processing circuitry is further configured to:
determine one or more channel indicators indicating at least one of a first channel quality of the first channel and a second channel quality of the second channel; and
dynamically control, based on the at least one of the first channel quality and the second channel quality, operations of at least one of the first transceiver, a first antenna structure coupled to the first transceiver, the second transceiver, and a second antenna structure coupled to the second transceiver.

15. The electronic device of claim 14, wherein the one or more channel indicators include a RSSI and a FER of the first channel, the first transceiver includes a first transmitter, and the processing circuitry is configured to:
determine the RSSI and FER based on signals transmitted and received by the first transceiver over the first channel;
compare the RSSI and FER with a pre-determined RSSI threshold and a pre-determined FER threshold, respectively; and
when the RSSI is determined to be larger than the RSSI threshold and the FER is determined to be less than the FER threshold, reduce a transmit power of the signals transmitted by the first transmitter over the first channel to reduce interference to the second transceiver.

16. The electronic device of claim 14, wherein the one or more channel indicators include a RSSI of the first channel, the first antenna structure includes multiple antennas, and the processing circuitry is configured to:
measure the RSSI based on signals received by the first transceiver;
compare the RSSI with a pre-determined RSSI threshold; and
when the RSSI is determined to be larger than the RSSI threshold, select a single antenna from the multiple antennas having a largest isolation from the second antenna structure to transmit the control packets to reduce interference to the second transceiver, the single antenna being one of the multiple antennas.

17. The electronic device of claim 14, wherein the second transceiver includes a second receiver, and the processing circuitry is configured to:
determine a SNR of the second channel; and
adjust receiver settings of the second receiver based on the SNR and a pre-determined isolation between the first antenna structure and the second antenna structure.

18. The electronic device of claim 12, wherein the first radio access technology is a WiFi radio access technology, and the second radio access technology is a Bluetooth radio access technology.

19. The electronic device of claim 12, wherein the control packets include acknowledgement packets (ACKs) and negative ACK packets (NACKs).

20. The electronic device for wireless communication of claim 12 wherein the first parameter is an average measured interval between the transmissions of the control packets over the first duration and the size limit for packets to be received by the second transceiver is based on the average measured interval.

21. The electronic device for wireless communication of claim 12, wherein a timing of the transmission of the packets received by the second transceiver is independent of a timing of transmission of the subsequent control packets by the first transceiver.

* * * * *